US007286912B2

United States Patent
Rubin et al.

(10) Patent No.: US 7,286,912 B2
(45) Date of Patent: Oct. 23, 2007

(54) METHOD AND APPARATUS FOR AVOIDANCE OF POWER LINES OR TRIP WIRES BY FIXED AND ROTARY WINGED AIRCRAFT

(75) Inventors: Eugene S. Rubin, Newton Centre, MA (US); Paul A. Zank, Brookline, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/104,125

(22) Filed: Apr. 12, 2005

(65) Prior Publication Data

US 2006/0009887 A1 Jan. 12, 2006

Related U.S. Application Data

(63) Continuation-in-part of application No. 10/315,561, filed on Dec. 10, 2002, now Pat. No. 6,922,059, and a continuation-in-part of application No. 10/917,793, filed on Aug. 12, 2004.

(60) Provisional application No. 60/640,227, filed on Jan. 3, 2005, provisional application No. 60/356,557, filed on Dec. 10, 2002, provisional application No. 60/340,176, filed on Dec. 10, 2001.

(51) Int. Cl.
*G01R 31/02* (2006.01)
*G01C 21/06* (2006.01)
*G06F 19/00* (2006.01)

(52) U.S. Cl. .......................... 701/9; 701/10; 701/211; 701/301; 324/457; 340/561

(58) Field of Classification Search ................ 701/3, 701/4, 8, 9, 10, 207, 211, 300, 301; 340/854.8, 340/855.7, 903, 952, 957, 561; 342/29, 65; 324/457, 458, 347, 348
See application file for complete search history.

(56) References Cited

U.S. PATENT DOCUMENTS

| | | | | |
|---|---|---|---|---|
| 4,101,825 A | * | 7/1978 | Truax | 324/458 |
| 4,405,926 A | * | 9/1983 | Potter | 342/455 |
| 5,252,912 A | * | 10/1993 | Merritt et al. | 324/72 |
| 5,828,334 A | * | 10/1998 | Deegan | 342/90 |
| 5,859,597 A | * | 1/1999 | Cornelio et al. | 340/946 |
| 6,002,348 A | * | 12/1999 | Greene et al. | 340/963 |
| 6,134,502 A | * | 10/2000 | Sarangapani | 701/301 |

OTHER PUBLICATIONS

PCT International Search Report dated Jul. 6, 2006 of International Application No. PCT/US05/45643 filed Dec. 19, 2005.

* cited by examiner

*Primary Examiner*—Tan Q. Nguyen
(74) *Attorney, Agent, or Firm*—Daniel J. Long; Robert K. Tendler

(57) ABSTRACT

An E-field sensing system is provided to detect the presence of obstacles, including wires, power lines or trip wires, as well as towers, guy wires, buildings and elevated terrain, in which a variation or tilt of the iso-potential electrostatic field adjacent the obstacle is detected. In one embodiment the bearing to the obstacle is ascertained. The result is the detection of power lines from as far away as at least 1,000 feet and unpowered wires from as far away as at least 100 feet, thus reducing pilot anxiety for low level missions as well as providing for wire strike avoidance.

21 Claims, 8 Drawing Sheets

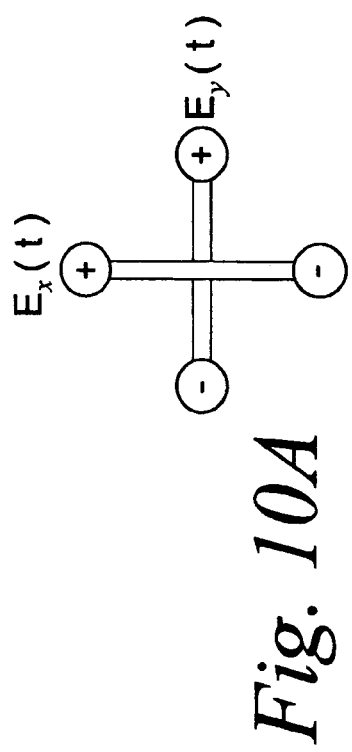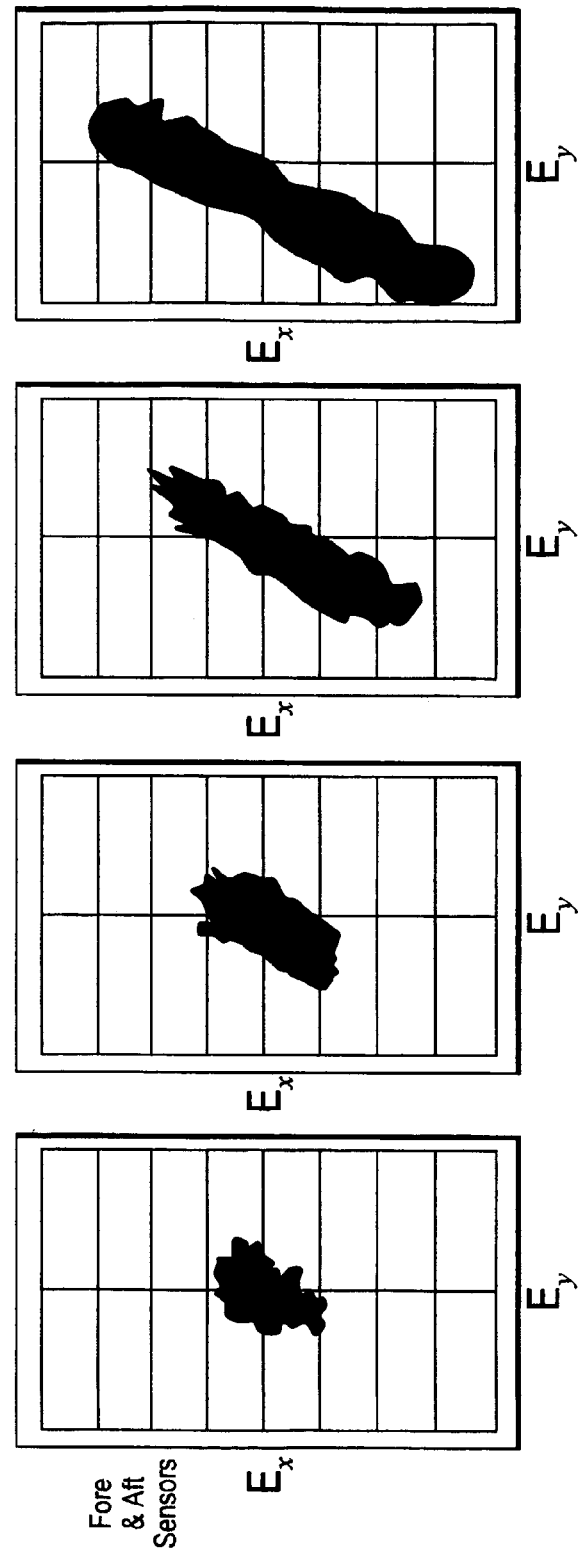
Fig. 10A Fig. 10B Fig. 10C Fig. 10D Fig. 10E

METHOD AND APPARATUS FOR AVOIDANCE OF POWER LINES OR TRIP WIRES BY FIXED AND ROTARY WINGED AIRCRAFT

RELATED APPLICATIONS

This is a continuation-in-part of U.S. applications Ser. No. 10/315,561 filed Dec. 10, 2002 now U.S. Pat. No. 6,922,059; 60/340,176 filed Dec. 10, 2001; 60/356,557 filed Feb. 12, 2003; and 10/917,793 filed Aug. 12, 2004, the contents all of which are incorporated herein by reference. This application also claims rights under 35 USC 119(e) from US application Ser. No. 60/640,227 filed Jan. 03, 2005, the contents of which is incorporated herein by reference.

FIELD OF THE INVENTION

This invention relates to aircraft safety and to two different modes of avoiding obstacles using the same hardware, and more particularly to a method and apparatus for warning pilots of wires, power lines or other obstacles in the flight path.

BACKGROUND OF THE INVENTION

The flying into power lines and other types of wire has proved to be a major hazard not only for military aircraft but also for commercial and general aviation. In addition to wire strike accidents, the stress of low-level flying is magnified by the possibility of flying into an unseen and often uncharted wire. Thus not only is the accident itself traumatic, the flying of low level missions either for the military or for surveillance, inspection or rescue missions causes great anxiety among pilots.

By way of background, data shows that many helicopters involved in accidents have been classified as wire-strike accidents.

Wires present particular risks to helicopters because helicopters often are flown at low altitudes and at off-airport sites for takeoff, landing, and other purposes. Some of the types of wires that pilots may encounter are power transmission lines, guy wires used to support other objects, such as towers and communication cables.

When crossing rivers and valleys, power transmission lines can be as high as several hundred feet above ground level (AGL). Guy wires that support towers may be almost invisible to pilots, even if the general location of the wires is known. Pilots' ability to see wires is affected by dirty windscreens, light conditions, the obscuring effects of terrain and changes in visual perspective that occur during climb and descent. In addition, accurately judging distance from unmarked wires is nearly impossible.

Data also shows that 30% of wire strike accidents resulted in at least one fatality, and 18% resulted in serious injuries. Many wire strike accidents occur at night, more often causing fatalities and destroying the helicopter.

By way of example, one fatal accident occurred in dark-night conditions near Littleton, Colo. A Bell 407, being operated as an emergency medical services (EMS) flight, struck wires after takeoff and fell inverted to the ground. All four people on board were killed.

The U.S. National Transportation Safety Board (NTSB) said, in the final report on the accident, that the helicopter had been flown to the site of the fatal automobile accident from the northeast and that the pilot had circled the area before conducting a north-to-south approach to the landing. Lights from emergency response vehicles on the ground illuminated the landing area.

After the patient was on board, the pilot, a former U.S. Army helicopter pilot with more than 4,000 hours of helicopter flight time, conducted a departure to the south and circled to the right, remaining at a low altitude. The NTSB report said that the pilot's company policy, which was promulgated through documents and training, included landing-zone departure procedures, which instructed the pilot to climb straight ahead in a near-vertical climb to a minimum of 300 feet AGL before turning.

About 630 feet west of the takeoff point, the helicopter struck unmarked power lines. Existence of the power lines was unknown to the fire-rescue on-scene commander, and the light conditions prevented the pilot from seeing anything outside the lighted area. The power lines were supported by two towers 622 feet apart and located on a riverside golf course. The unmarked power lines did not meet obstruction-lighting criteria and were not marked. In addition, they were not depicted on sectional or topographic maps.

Although the helicopter was equipped with a wire-strike protection system designed to help protect the helicopter in the event of inadvertent flight into horizontally strung wires or cables consisting of a windshield deflector, an upper cutter/deflector and a lower cutter/deflector, these measures proved insufficient to prevent the crash.

Note that in addition to reviewing aeronautical charts and talking with pilots who are familiar with the area, a pilot who is about to begin low-altitude operations first should conduct a reconnaissance flight at a higher altitude.

Nevertheless, those precautions may not be adequate for detecting all wires.

Wires are difficult to see, partly because of the way the human eye functions and partly because of the effects of some backgrounds and light angles in camouflaging wires. The eye starts to lose its visual acuity at three degrees off-center. Unless one is looking straight at a wire, one is unlikely to see it. Obviously, night operations are severely limited.

The movement of wires in the sunlight and changing sunlight patterns can obscure wires. Wires also may be difficult to see because as they age, their color often changes. For example, copper wires oxidize with age, acquiring a greenish color that makes them difficult to distinguish from grass and trees in the background. The exact location of specific wires may change throughout the day because of fluctuating ambient temperatures, which may cause wires to sag or to tighten within several hours. Also, sagging wires may be blown by wind. In addition, optical illusions involving wires are common.

The following are examples of some of the systems on the market to help identify power lines and prevent aircraft from colliding with them.

Spherical markers sometimes are used to mark power lines, communications lines, and guy wires at airports or helicopter approach areas and at locations where wires cross rivers and canyons. These markers often are orange, but in some instances, others colors are used because they may be more visible, depending on the surrounding terrain. Some spherical markers used on electrical power lines are designed to glow as a result of the power line's electrical field. Other spherical markers are patterned for improved visibility or equipped with flashing lights.

Several wire-detection systems developed in recent years have been installed in aircraft to warn pilots when they are near wires. For example, Safe Flight Instrument Corp.'s Powerline Detection System sense the electromagnetic field generated by live electrical power lines and emits an audible alert through the aircraft's audio system, a clicking sound that increases in frequency as the aircraft is flown nearer to a live electric power line, i.e., a line carrying electric current. The system then illuminates a red warning light in the cockpit. The warnings are provided regardless of whether the helicopter is approaching the power line from above, below, or at an oblique angle. The system does not alert pilots to where the wires are and does not work with wires that are not live. Moreover, the distance at which the electromagnetic field can be sensed is sometimes only 30 feet.

The Hellas helicopter laser radar system developed by Dornier, a subsidiary of the European Aeronautic Defence and Space Co., uses eye-safe laser radar to scan the environment for wires and other flight obstacles and provides optical signals and acoustic signals to warn pilots about their presence. However, laser systems often miss the presence of wires.

During flight tests in which the locations of power lines were included in a computer database, Honeywell's Enhanced Ground-proximity Warning System (EGPWS), which warns pilots of rising terrain and obstacles that are 100 feet or more above ground level (AGL), delivers warnings of approximately 30-seconds to pilots that their helicopters were approaching the power lines. However, this system does not work for uncharted or unmapped wires.

Thus, although the system is capable of delivering the warnings, its database lacks the required information, which generally has not been available from utilities and other organizations that control wires.

In summary, because most rotary wing and fixed wing aircraft are not equipped with wire-detection systems and because not all wires are marked, wires continue to present risks.

What has become apparent is that cutters and deflectors are insufficient to prevent wire strike accidents. Moreover, although in the past large amounts have been invested in radar and LIDAR systems to illuminate and detect wires, be they power lines or trip wires, there is an unacceptably high failure to detect wires. In addition, because these systems are active systems from which the position of the aircraft can be ascertained, military use is ill advised. Thus for military applications there is a requirement for a passive wire strike avoidance system that is effective while maintaining a degree of stealth.

From the point of view of commercial and general aviation, there is likewise a requirement for a robust wire strike avoidance system that is inexpensive and effective.

SUMMARY OF INVENTION

Rather than using the active systems described above and rather than relying upon mechanical cutters to prevent damage to aircraft flying into wires, in the subject system low-flying fixed and rotary wing aircraft detect and avoid electrical power lines and/or trip wires by continuously measuring and monitoring differential static electric fields. This is done without producing emissions that could be detected by an adversary. Measuring dE/dt using a two-axis differential dE/dt sensor mounted on the aircraft provides a reliable indication not only of the existence of wires but also the direction of the wires relative to the flight path of the aircraft. In so doing not only may wire strikes be avoided because of the rebustness of the subject system, the stress is taken out of low-level flying. There are two types of wire detection for which the subject system is effective. The first is the case of power lines in which the voltage carried by the wire results in a constant frequency electric field that is readily detectable.

The second is the case of wires that carry no power, such as trip wires or guys. Here the distortion of the naturally occurring atmospheric electric field due to the wire is sensed even when there is no applied voltage.

It has been found that for power lines, depending on the voltage, one can detect the power lines from as far away as at least 1,000 feet. The system can be coupled to the programmable horizontal situation indicator carried by most aircraft such that the existence of and the bearing to the wire can be displayed using existing equipment.

For wires that are powered, namely those carrying 50/60 Hz current, E-field sensors are exceptionally robust due to the electric fields generated by the voltage on the power lines. Note that this is an electric field, not a magnetic field that is detected, which makes it possible to detect wires at much greater distances than with electromagnetic sensors.

The differential E-field sensors are also useful in detecting so-called trip wires that are extended, for instance, across a valley. Detection is made possible because the electrostatic field around the wires is altered from that associated with the rest of the terrain. It has been found that a differential E-field sensor can sense a tipping of the E-field as the aircraft approaches such a trip wire, whether or not the trip wire is powered.

Of course if the trip wire is located adjacent an AC field, the trip wire itself may acquire a voltage that results in an electrostatic component. In such a case, detectability is increased.

In any event, the presence of a wire and its bearing is easily sensed using differential E-field sensors, one pair lying transverse to the aircraft fuselage and the other lying nose to tail. The result of using the two pairs is 360° horizontal detectability. With a third pair of E-field sensors one can also detect elevation. Note a more important reason for the third axis is to measure the horizontal electric field even though the aircraft is in a high pitch or bank angle.

The subject application is made possible by the development of a novel E-field sensor described in patent application Ser. No. 60/356,557 filed Dec. 10, 2002 and incorporated herein by reference. The E-field sensor was primarily directed to finding moving projectiles, rocket launches, and even the presence of individuals on the surface of the earth. It was found that each of these events produced a significant tilt or shift in the surrounding E-field that could be sensed by an E-field detector system including at least one E-field distortion sensor that could detect the distortion of the E-field by a person, vehicle, weapon or electric power source. Coupled to this E-field sensor was a system for compensating for background noise by using coherent signal processing to isolate the detected source from the background noise and thus enable correlation of the distortion source with its electrostatic signature.

Note, the use of at least two E-field sensors in conjunction with coherent signal processing enables substantial reduction of background noise, which permits detection of E-field distortion at greater ranges and sensitivity than heretofore possible and also facilitates signature correlation of the detected object with characteristic E-field distortions of like and similar sources.

Not only can the E-field sensor be used for wire strike avoidance by manned aircraft, it is also useful for unmanned aerial vehicles or UAVs which likewise can fly into trip wires or power lines.

In one embodiment the E-field sensor includes a sensing element for detecting electric field signals, a guard area approximate the sensing element in a differential amplifier stage with bootstrapping coupled to the sensing element. There is a filter stage connecting to the output side of the amplifier stage in an analog-to-digital converter coupled to the filter stage for converting the electric field signals to digital data. Finally, there is a micro-controller coupled to the analog-to-digital converter for processing the digital data.

More particularly, in one embodiment the electric field sensor for detecting electrostatic field disturbances uses a first set of sensing elements for detecting electric field signals, a first pre-amplifier coupled to the sensing element, wherein the first pre-amplifier is coupled to a first bootstrapping circuit. There is a second sensing element for detecting electrostatic field signals with a second pre-amplifier coupled to a second sensing circuit, wherein the second pre-amplifier is coupled to a second bootstrapping circuit. A differential amplifier coupled to the first pre-amplifier and the second pre-amplifier is also coupled to a filter stage connecting to the differential amplifier. An analog-to-digital converter is coupled to the filter stage for converting the electric field signals to digital data. Finally, there is a microprocessor coupled to the analog-to-digital converter for processing the digital data.

In order to provide the pilot with an indication of the presence of a wire and its bearing, in one embodiment of the digital processor a two argument, arctangent algorithm (ATAN2) is used to provide 360° relative heading. Moreover, when the amplitude of the 50/60 Hz signal exceeds a predetermined threshold an audible or visual alarm is activated.

In summary, an E-field sensing system is provided to detect the presence of obstacles, including wires, power lines or trip wires, as well as towers, guy wires, buildings and elevated terrain, in which a variation or tilt of the iso-potential electrostatic field adjacent the obstacle is detected. In one embodiment the bearing to the obstacle is ascertained. The result is the detection of power lines from as far away as at least 1,000 feet and unpowered wires from as far away as at least 100 feet, thus reducing pilot anxiety for low level missions as well as providing for wire strike avoidance.

BRIEF DESCRIPTION OF THE DRAWINGS

These and other features of the subject invention will be better understood in connection with a Detailed Description, in conjunction with the Drawings, of which:

FIG. 10A is a diagrammatic illustration showing four sensors orthogonally oriented for measuring in two axes;

FIGS. 10B-10E are scatter plots of the results of a test as sensors approach electric power lines, with the scatter plot dots being scattered around due to electric field changes; and, FIG. 11 is a diagrammatic illustration of the E-field vector tilt due to the presence of a guyed vertical conducting structure such as a tower.

DETAILED DESCRIPTION

It was found during testing that one could reliably detect power lines at 1,000 feet and that one could readily determine the direction of the power lines relative to the flight path of the aircraft. Thus, it became readily apparent that one of the major utilities for the differential E-field sensors was on low level combat missions where danger to the pilot and the aircraft is due to the existence either of unmapped, virtually invisible power lines or, in fact, to virtually invisible trip wires that are sometimes used to countermeasure low-flying aircraft such as helicopters and UAVs in addition to towers, long vertical upright antennas, etc.

Power Lines

Figure 1:
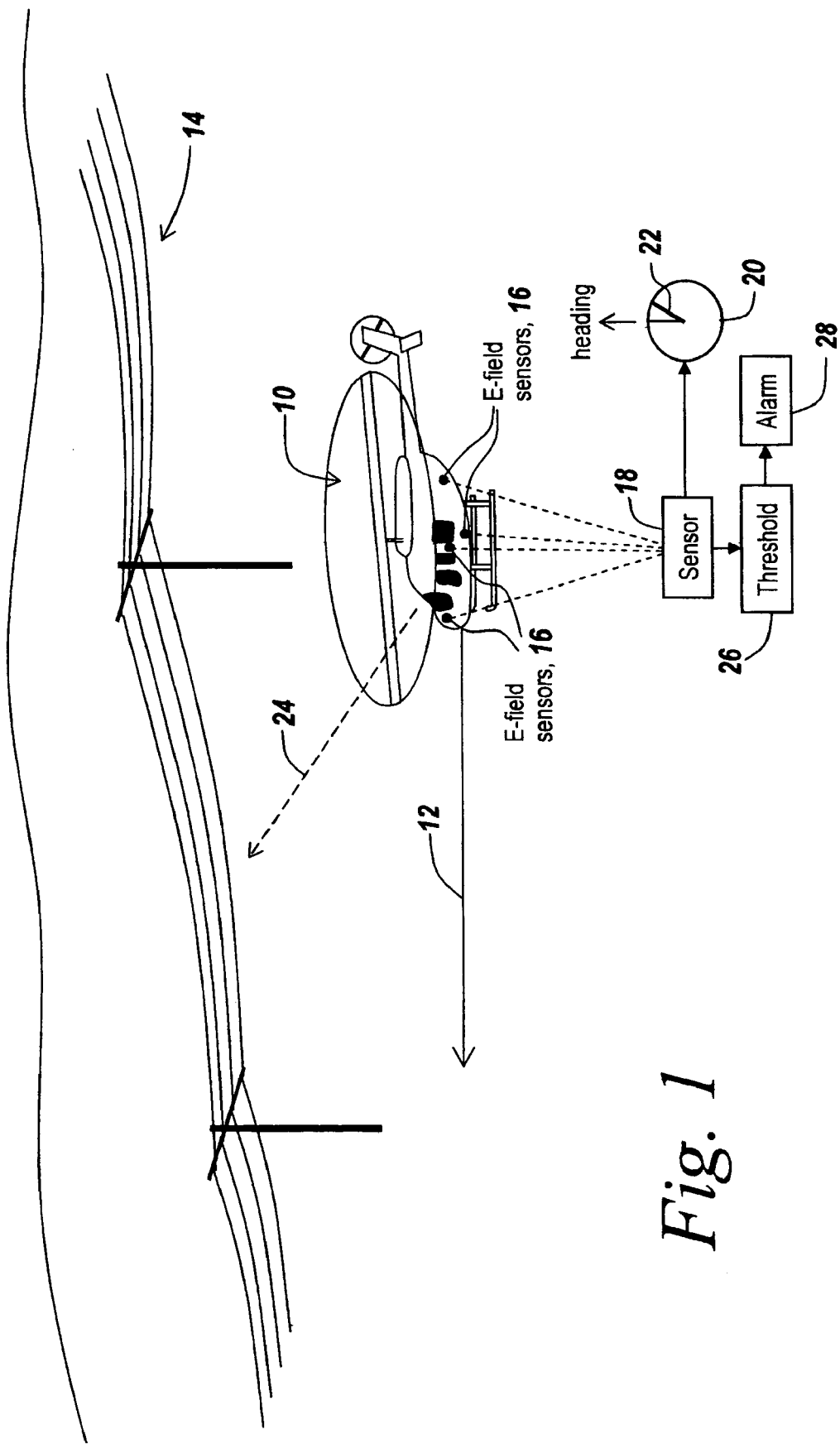
FIG. 1 is a diagrammatic illustration of the sensing of power lines from a helicopter using E-field sensors in which the presence and heading of the wires relative to the flight path are indicated.

Referring now to FIG. 1, in one embodiment a helicopter 10 is flying along a flight path 12 towards power lines 14. As is oftentimes the case, the power line locations are unknown and are relatively invisible such that the pilot requires advance notice of their presence to be able to avoid them.

As part of the subject invention, the aircraft is provided with pairs of E-field sensors 16, which are coupled to a processor 18 that processes the signals from two differential pairs that are orthogonally oriented and provides a display 20 of the relative bearing 22 to the power lines. Here, the relative bearing to the power lines is illustrated by dotted line 24 so that as the pilot turns away from the power lines the bearing line displayed to the pilot will change. Thus the pilot can be assured that he will miss the power lines.

Also shown is a threshold detector 26 in which the amplitude of the power line frequency component is used to activate a cockpit alarm 28, which may be either audible or visible.

Note that the E-field sensor is in essence an extremely high-impedance voltmeter (electrometer). Since one knows that one is looking for 60- or 50-Hz signals that are spectrally pure, one sets the filters for the processor to look for these signals and to watch for long-term drift of the potential gradient. As will be seen, if the aircraft has left and right E-field sensors and if the aircraft flight path is parallel to the power lines, one sees a large amount of power, whereas when it is not parallel the amount of power drops off, such as when one is banking or turning. By using orthogonally-oriented pairs of sensors, one obtains a direction component that is related to the bearing of the power line, with the output of the processor indicating where the power line is relative to aircraft heading. As mentioned hereinbefore, the output of the processor may be coupled to a conventional programmable horizontal situation indicator available on every aircraft such that one can use existing equipment to display a pipper that shows when one is going in a particular direction that one has a problem.

It has been found that the electric field caused by the high voltage power lines permits the power lines to be detected from at least 1,000 feet, clearly ample time for the pilot to execute evasive action. Note that power lines range in voltage from 30,000 volts to 125,000 volts to even as high as 400,000 volts. The range for which the power lines can be detected is voltage- and power line height-dependent.

Note, however, that when one distributes power, one typically uses a four-wire system in which a safety ground overhead is used to keep lightning from hitting the power-carrying lines, thus to eliminate destruction of transformers and related equipment. Each of the three remaining power lines creates an electric field, being 120° out of phase with the others in a typical three-phase power distribution system. If one plots the resultant vector of all three fields, one obtains an electric field vector that is actually rotating at 50/60 Hz.

Note that for residential lines one may be carrying only one phase. It will be appreciated that in single-phase line systems one has a larger electric field than three-phase systems. This is because in a three-phase power distribution system the electric fields partially cancel each other out. Thus, a single high-tension line at one voltage will be detectable at a greater range than a three-phase system at the same voltage. However, the subject system is able to detect either one.

The subject system can detect power lines from at least 1,000 feet. Electromagnetic sensors may only be effective at as little as 30 feet, thus giving the pilot no ability to avoid contact with the power lines.

Figure 2:
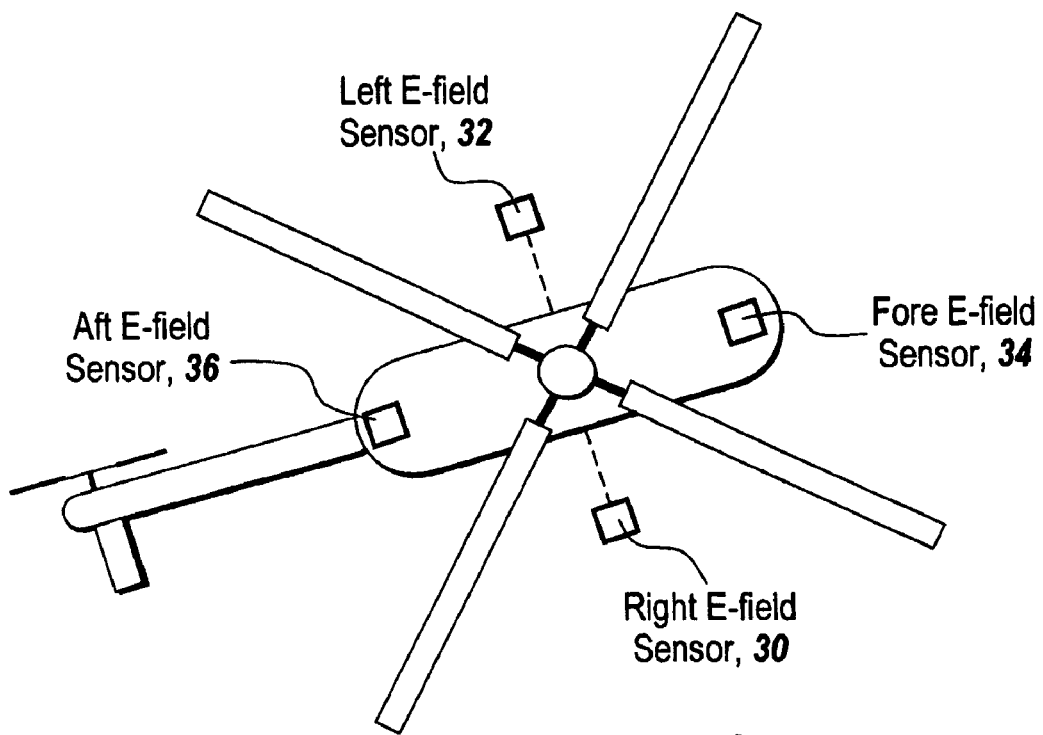
FIG. 2 is a top view of the helicopter of FIG. 1, illustrating right and left E-field sensors and fore-and-aft E-field sensors so as to provide 360° coverage.

In order to provide 360° detection and referring now to FIG. 2, one has two pairs of E-field sensors, right and left E-field sensors 30 and 32 and fore-and-aft E-field sensors 34 and 36.

Figure 3:
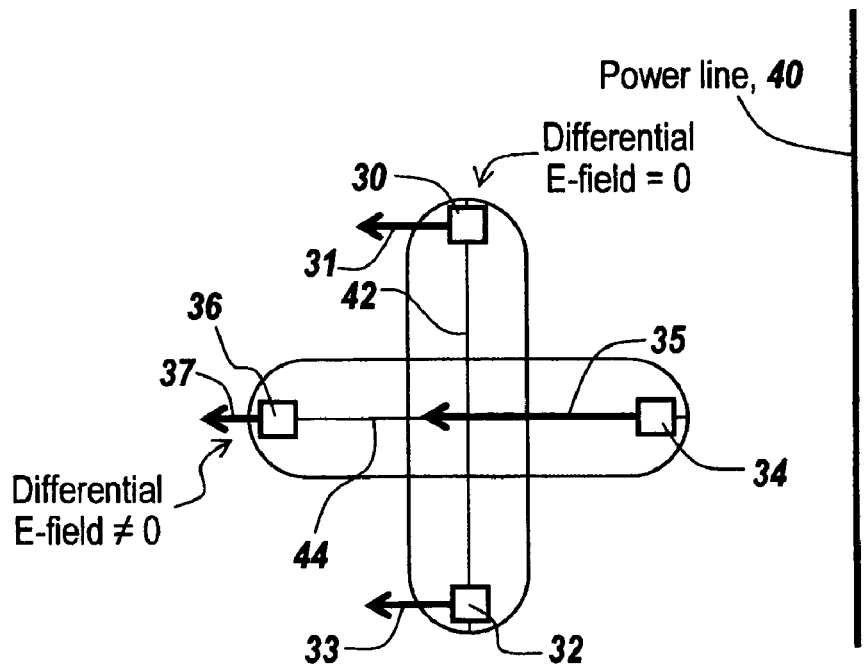
FIG. 3 is a diagrammatic illustration of the position of the orthogonally-oriented pairs of E-field sensors of FIG. 2, showing that for an E-field sensor axis parallel to the power line there is no differential in the E-field, whereas the maximum differential occurs for the orthogonally-oriented fore-and-aft sensors.

Referring now to FIG. 3, assuming a power line 40 oriented as illustrated parallel to a line 42 between right and left E-field sensors 30 and 32, then the differential E-field would be zero for the sensors oriented in this position. This is because the amplitudes at sensors 30 and 32 are equal as indicated by vectors 31 and 33.

However, for fore-and-aft sensors 34 and 36 oriented orthogonal to power line 40 along line 44, then the outputs of these two differential E-field sensors would be at a maximum due to the orthogonal orientation with respect to the power line, and since one sensor is much closer to the line than the other sensor. Here sensor 34 has an E-field output vector 35 that is clearly longer than the output vector 37 from sensor 36.

Figure 4:
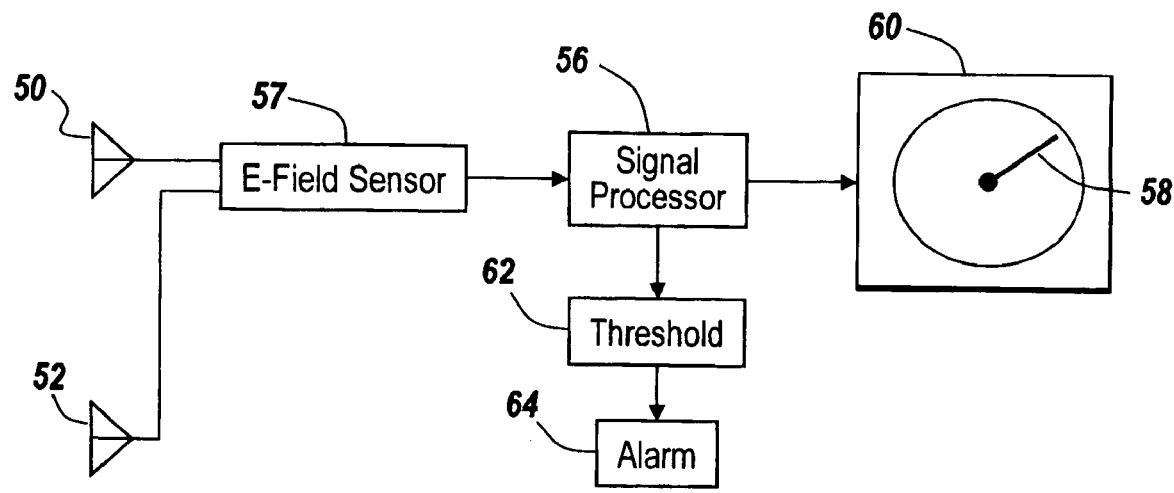
FIG. 4 is a block diagram of the processing of a pair of E-field sensors of FIGS. 2 and 3, illustrating a gradient drift processor coupled to the E-field sensors, with the output being provided on a pilot display in terms of bearing to the detected wire, the block diagram also showing a thresholding circuit and an alarm circuit coupled thereto.

Referring now to FIG. 4, E-field sensor pads or antennas 50 and 52 are coupled to an E-field sensing circuit 57, which is in turn coupled to a processor 56 that determines from the slowly shifting gradient the bearing 58 to the wire. Bearing 58 is displayed on a pilot display 60, with a thresholding circuit 62 used to activate an alarm 64 when the gradient drift amplitude exceeds a predetermined threshold.

Figure 5:
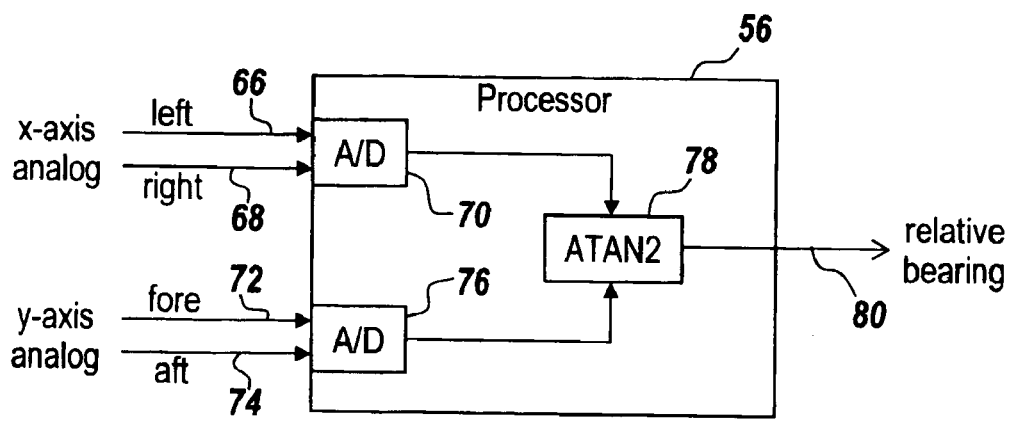
FIG. 5 is a block diagram of the gradient drift processor of FIG. 4, illustrating inputs from the left, right, fore and aft pairs of E-field sensors of FIGS. 1 and 2, with the inputs being converted to digital signals by analog-to-digital converters and processed by an arc tan 2 algorithm to output relative heading coupled to a pilot display.

Referring now to FIG. 5, the derivation of the relative heading for processor 56 is quite straightforward. Assuming that one has left-right and fore-and-aft sensors, then for the left-right sensors having inputs 66 and 68 coupled to an analog-to-digital converter 70, and assuming fore-and-aft inputs 72 and 74 coupled to an analog-to-digital converter 76, then the outputs of the analog-to-digital converters may be applied to an arc tangent 2 algorithm, here illustrated at 78 to provide relative heading 80.

With respect to the change of the electrostatic field, it is noted that for power lines the vector oscillates at 50/60 Hz or 50/60 times a second. This narrow bandwidth signal is easily filtered so as to provide a signal that is exceptionally large and with an exceptional signal-to-noise ratio.

Figure 6:
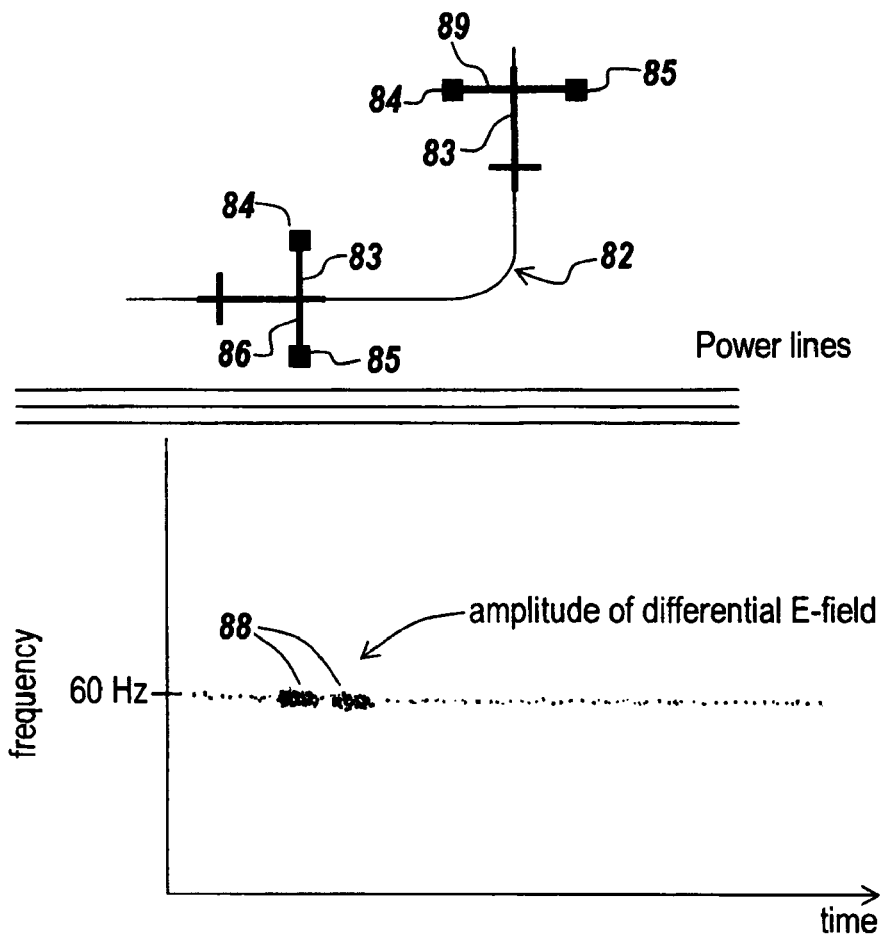
FIG. 6 is a spectrogram illustrating the results of a test in which right and left E-field sensors are flown near a power line, indicating by the relative intensity of the dots the orientation of the left-right sensors relative to the power line, with the maximum differential amplitude occurring when the axis of the two sensors is orthogonal to the power line and minimal when it is parallel.

FIG. 6 graphs the strength of the 60 cycle signal and indicates that, for a pair of differential sensors flying about a power line as illustrated by flight path 82 of aircraft 83, at certain points the differential sensors 84 and 85 will be on a line 86 perpendicular to the power line, at which point the magnitude of the difference is large as illustrated by points 88, whereas if the line between the two sensors is parallel to the power line as illustrated at 89, there may be no differential voltage whatsoever, as illustrated by the sparse scattering of the dots that are due to noise. How the electrostatic field is measured is now described in connection with FIG. 7.

Figure 7:
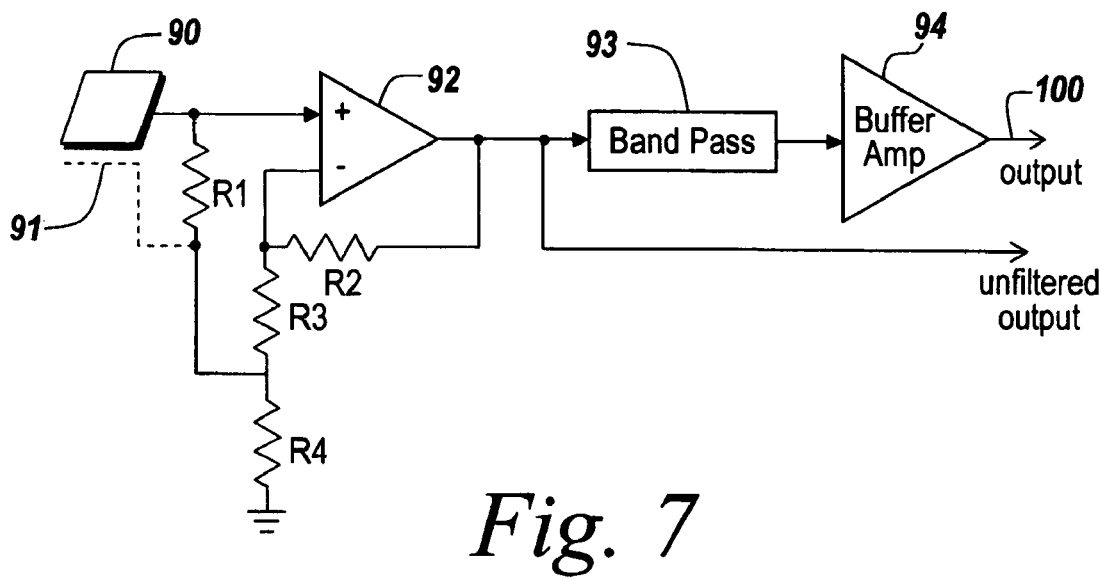
FIG. 7 is a basic block diagram of an E-field sensor, showing the sensing area, guard, high impedance amplifier with bootstrapping, filter and buffer amplifier.

FIG. 7 is a block diagram representing a simple embodiment of a sensor used for detecting E-field distortions illustrating the circuit arrangement as well as the interconnection of the inputs and outputs. The sensing area 90 or "antenna" is a small conductive element.

The sensor area 90 in FIG. 7 can essentially be regarded as one side of a capacitor with the remainder of the sensor being the charged source or even the earth's field being the source. The larger the area the greater the sensitivity, however interference and extraneous signals become problematic if the sensitivity is too high. In one embodiment the pad is approximately 1/30 inch squared and picks up signals as low as 200 microvolts. Experimentation of other sensing areas from about 1/10 of a square inch to several inches has resulted in different data measurements and the size of the antenna depends upon the application and environmental conditions.

There is a guard area 91 proximate the sensing element that functions to reduce the "capacitance." In one embodiment where the circuit is laid out on a printed circuit board, the guard area is a wiring board etch on the opposite side of printed circuit board opposing the sensing area 90. The guard 91 primarily eliminates the capacitance of the shield, such as coax cable, thereby greatly increasing the antenna 90 impedance. In one embodiment the sensing element 90 is designed for maximum input impedance with a partial Faraday shield covering a portion of the sensing area 90 to reduce the gain.

Thus, the size of the sensor area 90 is one method to adjust system gain, while another adjustment mechanism is the shielding. Subsequent signal processing and filtering is used to reject unwanted signals, for example, narrow pulses or relatively high frequency signals such as those caused by lightening, arc welders, and RF sources.

A differential amplifier 92 is used with bootstrapping to establish high impedance and provide amplification. The gain of the differential amplifier 92 is determined by the resistors R2, R3, and R4 and as is well known in the art, that the gain is equal to (R2+R3+R4)/(R3+R4). The resistors R3 and R4 determine the percentage of input signal that is coupled to one side of R1 and the guard 91. For example, R3=1k and R4=9k, the voltage at the junction of R3 and R4 is 90% of the voltage at the sensing area 90. In effect, R1 appears ten times larger, and the capacitance of the sensing area 90 to be ten times lower.

Expressed differently, if the voltage at junction 91 were 99.9% of that present at the sensing area 90, the R3 would appear 1000 times larger and the capacitance of the sensing area 90 would appear to be 1000 times smaller. Thus the ratio of R3 to R4 determines the input resistance to the amplifier 92. It is preferred to make the input impedance very high without having amplifier 92 saturate due to its input bias currents. Typical feedback ratios are from 90% to 99% while the value of R1 might be 10 Mohms, giving an effective input resistance of 100 to 1000 Mohms or more.

Figure 8:
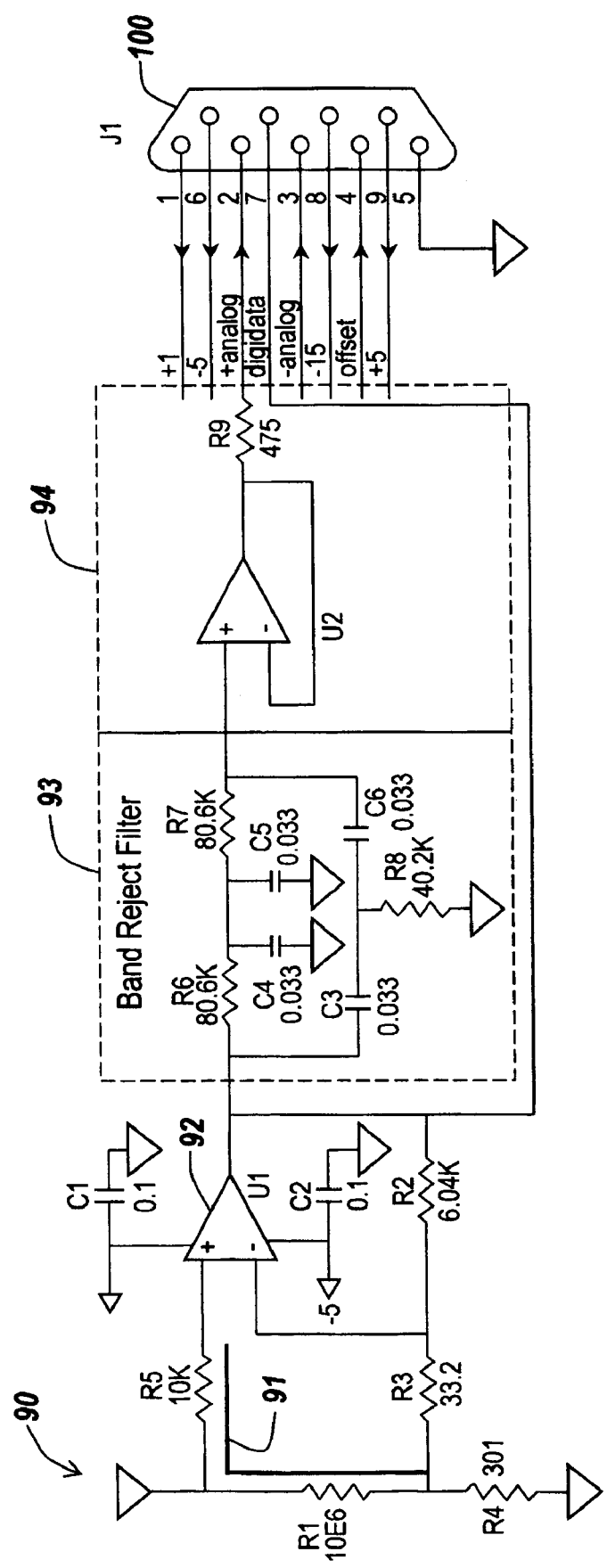
FIG. 8 is a general schematic diagram for a single-sensor configuration.

Referring to FIG. 8, in a preferred embodiment, the differential amplifier 92 is a field-effect operational amplifier U1 (op amp TLC2272) with bootstrapping to provide high impedance for the sensing element 90. In this circuit, the sensing element 90 is a small metallic piece that is part of the printed wiring board, such as an etch on the board. The sensing element signal is amplified and converted to a low source impedance. R1 is 10 Mohm, R2 is 6.04 Kohm, R3 is 33.2 ohm and R4 is 301 ohm. An additional resistor R5 may be connected between the sensing area 90 and the + input of the differential amplifier 92 of approximately 10 Kohm to provide amplifier protection.

A frequency filter 93 may be used in other applications when not looking to detect power lines. In this case filter 93 is a power line 60-Hz pass band filter used to pass the E field caused by power lines and is set to the power line frequency for the region of use, generally 60 Hz in the United States. In one embodiment, off-the-shelf commercial components are utilized to construct the filter 93. The 60-Hz pass band filter 93 is inserted to reject out-of-band signals.

A buffer amplifier 94 provides high input impedance to the filter 93 while providing additional gain and a low impedance source for the voltage measuring device. Typically the measuring device is a sample-and-hold circuit followed by an analog-to-digital (A/D) converter and subsequent processing circuitry.

The buffer amplifier stage 94 in one embodiment is a second field-effect operational amplifier U2 (op amp TLC2272) and is used to achieve an approximate gain of 20 dB. A 15v DC power is supplied by a power source, such as common dry cell batteries, although any power source with acceptable output may be used. The output signal of the sensor device is delivered to the next stage of the detection system.

The sensor does not require unique components and persons skilled in the art will choose components that will enable optimal configuration to achieve the objectives of the sensor's application. The combination of the sensing elements and guard in conjunction with the bootstrapped differential amplifier and other elements enables the unexpected sensing of electric field disturbances in a wide array of applications.

Trip Wire Sensing

As to trip wire sensing where there is no induced voltage, one is still able to detect the tipping of the E-field adjacent the wire. Here the tipping is relatively slow and the circuit of FIG. 7 is modified as shown in FIG. 8 to have the bandpass filter now converted to a band reject filter 93'. The obvious purpose of the notch filter is to notch out any AC power line-induced fields, with the frequency of the sensed E-field being in the low- or sub-Hz range.

Other noise-reducing techniques can be used in the trip wire case to minimize background noise, once having removed 60 cycle AC components. Thus, as can be seen in FIG. 8, what is presented is a schematic of one circuit illustrating the component selection for the differential amplifier as well as the electrical interconnection. In this embodiment off-the-shelf commercial components are utilized. A field-effect operational amplifier (op amp) U1 such as TLC2272 is used to perform impedance matching for the sensing antenna 90. In this circuit, the sensing antenna 90 is a small metal pad on a printed circuit board with a corresponding guard 91 on the opposite side of the board. The effective antenna impedance is approximately 1000 Mohms and the sensing area signal is amplified to a low ($\cong$90 ohms) source by the amplifier U1. The bootstrapping interface discussed herein establishes the high impedance input and provides amplification.

A notch filter 93' is inserted to reject the 60-Hz E-field signals. The selection of components R6, R7, R8, C3 and C6 are selected as known in the art and other values are possible.

The second field-effect operational amplifier (op amp) U2 is used to achieve an approximate gain of 20 dB. DC power is supplied by common dry cell batteries in one embodiment. However, power can also be provided from an AC source after AC/DC conversion. Other power sources such as solar and coupling power from power lines have also been contemplated. The sensor device output signals are delivered to the next stage of the detection system (not shown) through a connector J1.

Figure 9:
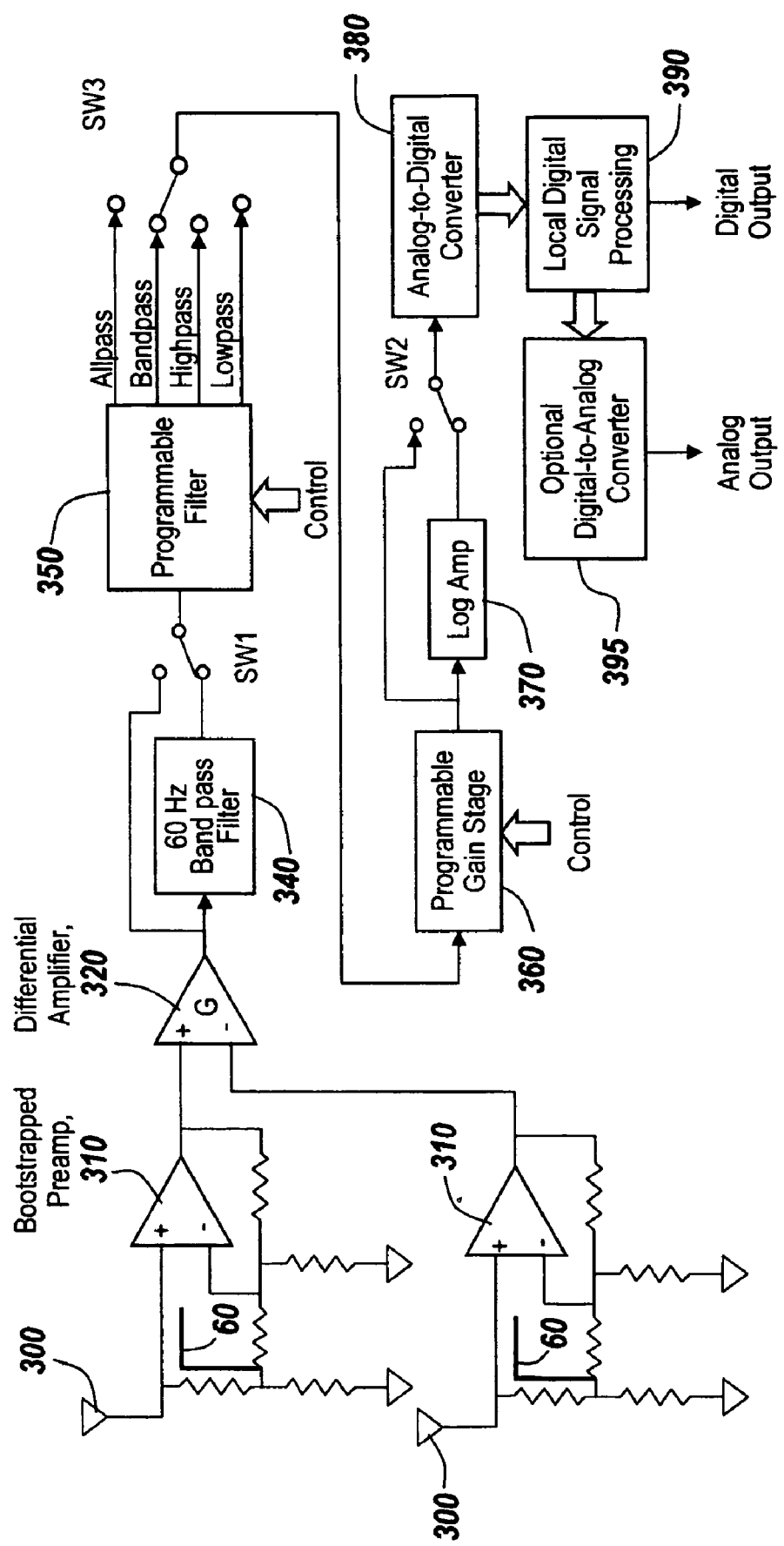
FIG. 9 is a block diagram illustrating a dual-differential sensor system with various programmable configurations.

FIG. 9 shows one embodiment that encompasses dual sensors 300 for a differential field sensor and the signal processing requirements. It should be understood that the device can be run in single ended mode by grounding one antenna 300 which can allow for redundancy. The parallel connections allow the processing unit 390 to gather data from the multiple sensors 300 and process the data accordingly.

This embodiment employs two sensing elements 300 and two corresponding bootstrapped preamps 310 for boosting the input signal strength. The output of the preamps 310 are connected to a differential amplifier 320 and 60-Hz bandpass filter 340. Filter 340 can also be bypassed by switch SW1. A programmable filter 350 and programmable gain stage 360, and logarithmic amplifier 370 (logamp) are employed to process and enhance the electrostatic signature of the detected source prior to its passage to the analog and digital converters 380 generating digital data representing the received signals. The digitized data is coupled to a processing unit 390 such as a microprocessor or microcontroller, which performs processing to configure the output signal parameters for use by the next stage of the detection system. An optional Digital-to-Analog converter 395 can be used to re-convert the digitized data to analog form in order to have the raw data presented to the user.

In this embodiment the programmable filter 350 includes an Allpass, Bandpass, Highpass and Lowpass filtering depending upon the application. The selectability of filtering via switch SW3 allows flexibility in isolating the signal of interest as well as eliminating interfering noise. The programmable gain stage 360 permits variable boosting of the received signal. The log amp 370 boosts the signal depending upon the input level to a level satisfactory for further processing. In this embodiment the log amp stage 370 can be bypassed by switch SW2. The control to the programmable filter 350 and gain stage 360 are commands from the local signal processor although external commands via hard wired or wireless are within the scope of the invention. The output of the differential field sensor is delivered to the next stage of the detection system at the digital output terminal.

In one embodiment, the processing unit 390 has internal memory (not shown) or connection to external memory that stores the measured data. The output data can also be stored to establish a library of E-field signatures that allow for classification and identification of measurements. This stored data is useful when comparing the present measurements to the existing database. For example, the signature of a certain event can possibly be matched for future measurements.

Referring to FIGS. 10A-10E, the E-field distortion associated with power lines is described and more particularly how one determines if one is near a power line. Using pairs of E-field sensors on orthogonal axes as indicated in FIG. 10A, when one is far from a power line the scatter plot in the X versus Y directions is symmetric as shown in FIG. 10B. As one moves closer to the power lines, as indicated in FIGS. 10C-10E the symmetric scatter plot elongates and in essence represents a line of electric flux from the power line. Thus when the sensors are far away the differential E-fields are random, producing a symmetric pattern. When the sensors get closer the pattern takes on a linear shape, indicating amplitude and phase coherence.

In the power line embodiment, the sensors are measuring the 50/60-Hz signals, so a bandpass filter would be used to isolate the 50/60-Hz signals. FIGS. 10B-10E show test results as the E-field sensor approaches the high voltage power lines. The 50/60-Hz amplitude and phase coherence increases and is easily discernable.

As discussed herein, coherent processing from multiple sensors of a single measurement greatly improves the measurement capabilities by reducing the impact of noise and interference. The coherent processing is described in detail in related application U.S. application Ser. No. 10/256,812, filed Sep. 27, 2002 which is incorporated by reference.

The coherent noise reduction works because the background noise is "far field" and low frequency. This means that two sensors placed apart see exactly the same background noise. If the signal of interest is in the near field, (less than 100 feet in one test) the sensors see the signal of interest at different signal strengths. When the two sensors are subtracted, the background noise disappears while some of the signal of interest remains. No knowledge of the background noise is required. This technology is well known to those skilled in the art and is applied to noise reduction head sets and microphones. This is distinguishable from bandpass filters, low pass filters, and high pass filters, that essentially reject interfering signals within a certain frequency. Bandpass filters reject signals in a certain frequency band. High pass filters reject lower frequency signals while allowing higher frequency signals. Low pass filters allow certain lower frequency signals while rejecting high frequency signals.

The noise reduction processing can be shown by the following equations for two sensors:

$S1(t)$ is the total signal received at sensor 1
$S2(t)$ is the total signal received at sensor 2
$P1(t)$ is the signal at S1 from the signal of interest
$Nb(t)$ is the background noise (assumed to be far field and therefore the same at both sensors)
$P2(t)$ is the signal at S2 from the signal of interest $$S1(t)=Nb(t)+P1(t)$$

$$S2(t)=Nb(t)+P2(t)$$

$$P2(t)=kP1(t)$$

$k<1$ $$Sdiff=S1(t)-S2(t)=(Nb(t)+P1(t))-(Nb(t)+P2(t))$$

$$Sdiff=P1(t)-kP2(t)$$

$$Sdiff=(1-k)P1(t)$$

The signal of interest is somewhat reduced in strength but background noise is essentially eliminated. Thus signal to noise ratio (SNR) is greatly improved.

Figure 11:
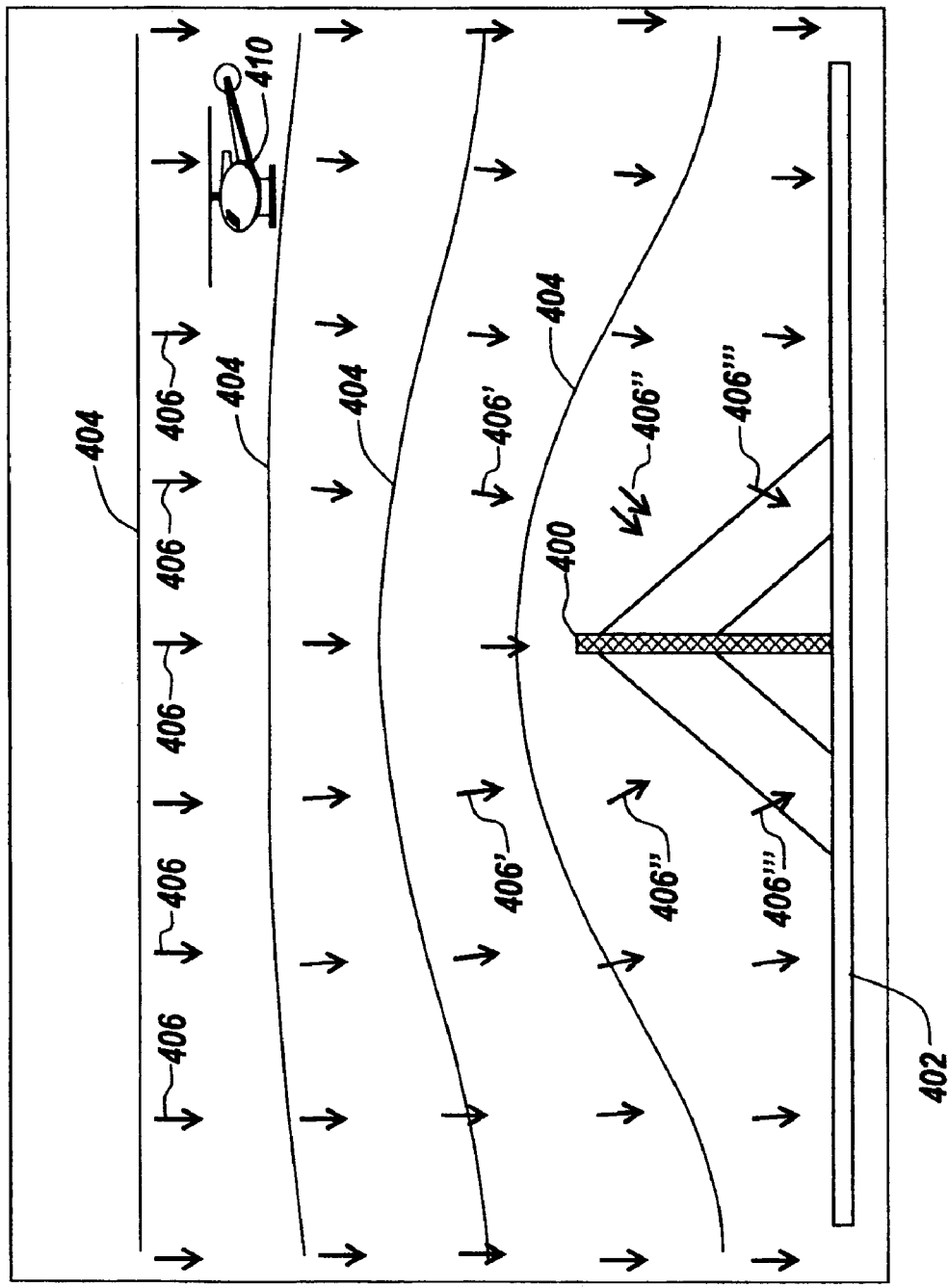

Referring now to FIG. 11, in an Ansoft Maxwell 2D plot, the effect of a vertically rising conductive structure such as a tower 400 above the surface of the earth 402 is shown in which isopleths 404 are distorted by the structure. Here it can be seen that the isopleths are disturbed as illustrated in the vicinity of the tower.

Also shown are the E-field vectors 406. As can be seen, as one approaches the tower, the direction of the E-field vectors 406 tilt towards the tower at shown by vectors 406', 406" and 406'''.

It is this tilt towards the tower or wires that is sensed by the subject system aboard a helicopter 410 so that the helicopter can readily avoid the structure causing the E-field tilt.

Thus, while the subject invention has been previously described in terms of power lines and horizontally running trip wires, the subject system can also detect vertical conductive structures and the guy wires used to support them so that these structures or wires can be avoided even when they are not horizontal.

The result is that the subject wire strike avoidance system can be described in general as an obstacle avoidance system useful in a wide variety of applications so as to permit avoiding wires, towers, building structures and even terrain including mountains or hills.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for alerting a pilot to the presence of an unpowered obstacle in the flight path of the aircraft he is piloting, comprising the steps of:
    detecting change in E-field at the aircraft due to the presence of an unpowered obstacle using a differential two-axis dE/dt sensor; and,
    alerting the pilot when the change in E-field exceeds a predetermined threshold, thus to alert the pilot to a tilt of an iso-potential electrostatic field carried due to the presence of the obstacle.

2. The method of claim 1, wherein the obstacle is a wire.

3. The method of claim 2, wherein the wire includes an unpowered wire.

4. The method of claim 1, wherein the obstacle includes a tower.

5. The method of claim 1, wherein the obstacle includes a building.

6. The method of claim 1, wherein the obstacle includes raised terrain.

7. The method of claim 1, wherein the change in E-field is derived from two spaced-apart electric field sensors.

8. The method of claim 7, wherein the difference between the outputs of the spaced-apart sensors is used to detect the change in E-field.

9. The method of claim 1, wherein the change in E-field is sensed by two orthogonally-oriented pairs of E-field sensors and further including the step of indicating to the pilot the bearing of the detected obstacle.

10. The method of claim 9, wherein the bearing is determined by the arc tangent of the signals from the pairs of E-field sensors.

11. A method of detecting the presence of an unpowered obstacle in the flight path of an aircraft, comprising the step of:

sensing the tilt of the iso-potential electrostatic field adjacent the obstacle caused by the obstacle using a differential two-axis dE/dt sensor.

12. The method of claim 11, wherein the tilt sensing includes measuring dE/dt.

13. The method of claim 12, wherein measuring dE/dt includes using a two-axis sensor.

14. The method of claim 11, and further including the step of providing an alarm when the sensed tilt exceeds a predetermined threshold.

15. The method of claim 11, and further including the step of providing an alarm proportional to the magnitude of the sensed tilt.

16. The method of claim 11, and further including the step of indicating the bearing to the obstacle.

17. The method of claim 16, wherein the step of indicating bearing includes performing an arc tangent process on the outputs of the sensors.

18. Apparatus for the detection of an obstacle in the flight path of an aircraft, comprising:

a first set of two-axis differential dE/dt sensing elements for detecting electrostatic field signals, each set having first and second sensors;

a first pre-amplifier coupled to a first sensing element in said first set;

a first boot-strapping circuit coupled to said first pre-amplifier;

a second sensing element in said first set for detecting electrostatic field signals;

a second pre-amplifier coupled to said second sensing element;

a second bootstrapping circuit coupled to said second pre-amplifier;

a first differential amplifier coupled to the outputs of said first pre-amplifier and said second pre-amplifier;

a filter stage coupled to the output of said first differential amplifier;

a first analog-to-digital converter coupled to said filter stage for converting electrostatic field signals to digital data; and, a microprocessor coupled to said first analog-to-digital converter for detecting a change in E-field, wherein a predetermined characteristic of the change in E-field determines the presence of an obstacle in said flight path.

19. The apparatus of claim 18, and further including a second set of electric-field differential two-axis dE/dt sensing elements, said second set of sensing elements having third and fourth sensors, said second set of sensing elements orthogonally oriented with respect to said first set of sensing elements, said second set of sensing elements having associated pre-amplifiers, bootstrapping circuits, a second differential amplifier and a second analog-to-digital converter, the outputs of said first and second analog-to-digital converters being processed with an arc tan algorithm to provide bearing to said obstacle.

20. The apparatus of claim 18, wherein each of said sensors includes a sensing pad and a guard area proximate to said sensing pad.

21. The apparatus of claim 18, wherein said obstacle includes a wire.

* * * * *